United States Patent [19]
Holker

[11] 3,757,752
[45] Sept. 11, 1973

[54] AIR FILTRATION AND OR REGULATION OF CARBURETOR AIR INTAKE TEMPERATURE

[75] Inventor: Richard John Holker, Marple, England

[73] Assignee: Fram Filters Ltd., Llantrisant, Pontyclun, Glamorgan, Wales

[22] Filed: Oct. 5, 1970

[21] Appl. No.: 78,089

[30] Foreign Application Priority Data
Oct. 7, 1969 Great Britain ................. 49,310/69

[52] U.S. Cl. ........................................... 123/122 D
[51] Int. Cl. ..................... B01d 27/08, F02m 31/06
[58] Field of Search ........................... 123/122 D; 55/DIG. 28, 418

[56] References Cited
UNITED STATES PATENTS
| | | | |
|---|---|---|---|
| 3,574,988 | 4/1971 | Buckman | 123/122 D |
| 2,781,032 | 2/1957 | Sebok et al. | 123/122 D |
| 1,816,936 | 8/1931 | Schneider | 123/122 D |
| 1,933,365 | 10/1933 | Chandler et al. | 123/122 D |

*Primary Examiner*—Laurence M. Goodridge
*Assistant Examiner*—Cort Flint
*Attorney*—Robert E. Hillman

[57] ABSTRACT

Air filter housing comprising a casing having an inlet and an outlet, the inlet cooperating with an inlet extension tube to provide an air intake orifice for the housing at the distal extremity of the inlet extension tube, and the outlet having an outlet orifice member for connection to the air intake of user apparatus (for example an internal combustion engine carburettor) downstream of the air filter; means for mounting a filter element in the casing to filter air flowing from the inlet orifice to the outlet orifice; and means responsive to the temperature of air in the filter housing for automatically varying the position of the inlet orifice with respect to the outlet orifice member in accordance with the temperature.

3 Claims, 8 Drawing Figures

AIR FILTRATION AND OR REGULATION OF CARBURETOR AIR INTAKE TEMPERATURE

This invention relates both to certain improvements to housings for air filters, for example, for internal combustion engine carburettor air intakes; and to internal combustion engines in which provision is made for regulating the temperature of inlet air to the carburettor by the use of such air filter housings.

Recently interest has been focused in the motor industry on ways of reducing the level of unburned hydrocarbons in vehicle or exhaust gases. One way in which the level of unburned hydrocarbons can be reduced is by temperature control of the carburettor inlet air. It has been proposed to provide an air filter having a housing with two inlet tubes, one being directed towards the source of heat such as the exhaust manifold, and the other being directed to a relatively cold area of the engine. It was proposed with this arrangement to provide a chamber at the junction of these two inlet tubes and having a flap valve arranged in its extreme positions to close off the respective inlet tubes. It was proposed that this arrangement be made automatically operative by coupling a temperature sensitive element to the flap valve.

There are a number of difficulties inherent in this arrangement and various proposals have been made in an effort to overcome them. For example, it is essential for the arrangement to work properly that the hot and cold air from the two inlets be thoroughly mixed upstream of the temperature sensing element. It was proposed to do this by providing a suitable mixing chamber between the chamber containing the flap valve and the chamber containing the filter proper; but such a mixing chamber necessarily increases the pressure differential. An alternative proposal was to place the temperature sensing element as close as possible to the carburettor connection tube, so that the flap valve and the sensing element were remote from each other.

It will be appreciated that this latter arrangement requires means for transmitting an actuating signal from the sensing element to the flap valve.

It is among the objects of the present invention to provide an air filter housing, which together with a filter element, may be used to filter the air intake to the carburettor of an internal combustion engine, and also to regulate the carburettor inlet air temperature. Such a filter housing may be of simpler construction than filter housings of the kinds mentioned above and more economical to produce.

In accordance with a first aspect of the present invention, there is provided a housing for an air filter, for example for an internal combustion engine carburettor air intake; which housing comprises a casing having an inlet and an outlet, said inlet cooperating with an inlet extension tube to provide an air intake orifice for the housing at the distal extremity of the inlet extension tube, and said outlet having an outlet orifice member for connection to the air intake of user apparatus (for example an internal combustion engine carburettor) downstream of the air filter; means for mounting a filter element in said casing to filter air flowing from the inlet orifice to the outlet orifice; and means responsive to the temperature of air in the filter housing for automatically varying the position of the inlet orifice with respect to the outlet orifice member in accordance with the said temperature.

In preferred embodiments of air filter housing in accordance with this invention, the outlet orifice member is connected to the casing, and the inlet extension tube is mounted for movement with respect to the casing, the temperature responsive means being operative to position the inlet extension tube with respect to the casing so as to alter the location of the distal extremity of said inlet extension tube in accordance with the temperature of air entering the casing.

In an alternative arrangement, the inlet extension tube is connected to the casing, and the combined casing and inlet extension tube are together moveable with respect to the outlet orifice member.

In practice the air filter is positioned with respect to the other parts of the engine such that the distal extremity of the inlet extension tube is caused to move between a region which is relatively hot when the engine is operating (such as adjacent the exhaust manifold) and a region which is relatively cold. Accordingly, this invention also provides, in a second aspect thereof, an internal combustion engine in which means are provided for regulating the temperature of inlet air to the carburettor; which means comprise an air filter having a filter housing, a filter element within the housing, an outlet from the housing connected for the flow of filtered air to the carburettor, an inlet extension tube providing an air intake orifice for the housing at the distal extremity of the inlet extension tube, means responsive to the temperature of air in the filter housing arranged to automatically vary the position of the air intake orifice in accordance with said temperature so that intake air is selectively taken up from regions in the neighbourhood of the engine which have relatively greater or lesser air temperatures when the engine is operative.

In preferred embodiments, the inlet extension tube is moved relatively to the casing by rotation about an axis under the influence of a coiled bimetallic element having one end fixed to the extension tube or a part joined thereto and the other end fixed to the housing casing or a part joined thereto.

The invention is hereinafter more particularly described by way of example only with reference to the accompanying drawings, in which.

Figure 1:
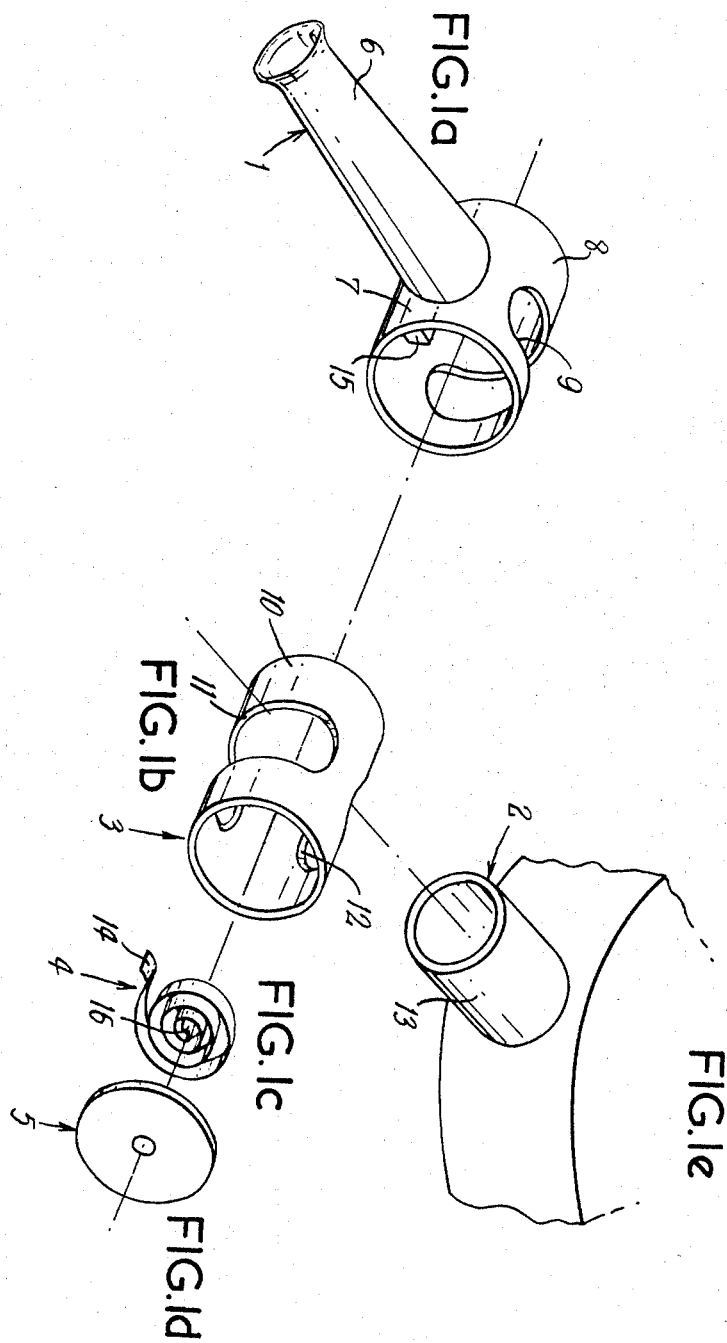
FIGS. 1a to 1e show the various parts in an exploded perspective view of a first embodiment of air filter housing constructed in accordance with the present invention.

The embodiment of filter housing shown in FIGS. 1a to 1e comprises an inlet extension tube member 1, which is interconnected with the casing 2 of the filter housing by means of a member 3 which acts as a hinge for the inlet extension tube member (as will be made clear subsequently), a bimetallic element 4 and an end cover 5. Inlet extension tube member 1 comprises an extension tube 6 which is integral with a hollow transverse cylindrical boss 7 having part of its curved surface 8 cut away at 9 for a purpose to be explained in more detail hereinafter. Hinge member 3 has a generally cylindrical configuration and is dimensioned to fit within hollow transverse cylindrical boss 7. The curved surface 10 of hinge member 3 is cut away at two portions 11 and 12. Cut out 11 is adapted to closely fit over inlet boss 13 provided on casing 2 of the filter housing. When the inlet extension tube member 1, and the hinge member 3 are so assembled on casing 2, it will be apparent that the inlet extension tube member 1 is capable of being swivelled about the axis of hinge member 3 provided that the cut out 9 on the curved surface 8 of boss 7 is dimensioned appropriately. The limits of this swivelling are set by the extreme ends of cut out 9. Cut out 12 on the curved surface 10 of hinge member 3 is provided to ensure that in all positions of inlet extension tube member 1 relative to the casing 2, communication is maintained between the interior of casing 2 and inlet tube 6.

It will be seen from FIG. 1c that bimetallic element 4 is in the form of a spiral coil. One end 14 of the coil is arranged to be fitted into a co-operating slot 15 provided on the interior surface of boss 7 of inlet extension tube member 1; and the other end 16 of bimetallic element 4 is adapted to be attached to the centre of end cover 5. The end cover 5 is in turn attached to and closes off the end of hinge member 3. There may be an exactly similar bimetallic element and end cover at the other axial end of hinge member 3, alternatively the other axial end of hinge member 3 may simply be closed off.

Changes in the temperature of the bimetallic element will result in relative coiling or uncoiling of its spiral turns. Since one end of the bimetallic element 4 is affixed to the end cover 5 which is connected via hinge member 3 to the casing 2 of the air filter (that is the said end of the bimetallic element is fixed relative to the casing) and the other end of the bimetallic element is affixed to the inlet extension tube member, the abovementioned change in temperature will result in relative rotation of the inlet extension tube member about the axis of the hinge member 3. In practice, when the air filter is mounted in a motor car the rotation abovementioned may be arranged such that when the bimetallic element is relatively cool the inlet extension tube member is rotated towards a region in the neighbourhood of the engine where the air temperature is relatively warm, and such that when the temperature of the bimetallic element is relatively high the inlet extension tube member is rotated towards a region in the neighbourhood of the engine where the air temperature is relatively cool. In this way an automatic regulation of the air temperature entering the casing of the air filter (and thence passing to the carburettor air intake) is achieved.

Figure 2:
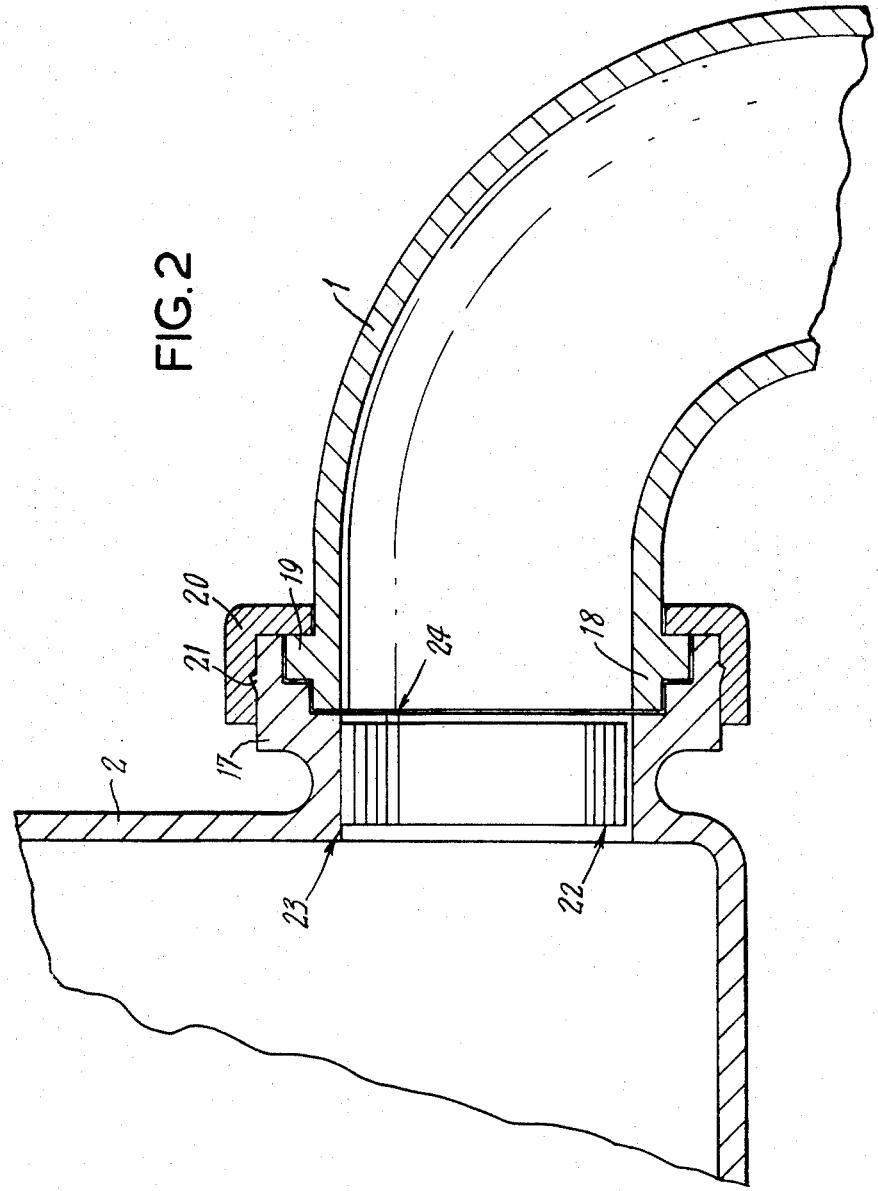
FIG. 2 shows a sectional view of part of a second embodiment of air filter housing constructed in accordance with the present invention.

FIG. 2 shows another arrangement capable of achieving the same result by employing an alternative embodiment of air filter housing constructed in accordance with the present invention. As will be seen from this figure the inlet extension tube member 1 employed has an inlet tube which is curved along its length (preferably the centre line of curvature is a true radius). The casing 2 of the air filter housing has an inlet boss 17 dimensioned to receive internally proximal end 18 of inlet extension tube member 1. End 18 of inlet extension tube member 1 is provided with a flange 19 dimensioned to be retained between the adjacent parts of inlet boss 17 and a retaining collar 20 which is held on the exterior of inlet boss 17 at 21. As shown, the retaining collar is held on the exterior of inlet boss 17 by a force fit; alternatively the two parts could be held together by mating screw threads. It is important that this arrangement should freely allow relative rotation of the inlet extension tube member about the axis of the inlet boss 17. A temperature sensing element is provided to control automatically this relative rotation. In the illustration the temperature sensing element is in the form of a spirally coiled bimetallic element 22 which has its outer end affixed at 23 to an internal surface of the inlet boss 17 and its spirally inner end affixed at 24 to the inlet extension tube member 1. It will be seen from FIG. 2 that the spiral coils of bimetallic element 22 extend less than half the available distance towards the axis of the spiral and also of the inlet boss 17. This is to allow a relatively unrestricted passage for the flow of air from inlet extension tube member 1 over and past the dimetallic element 22 and into the casing 2 of the air filter housing.

As with the previously described embodiment the bimetallic element is arranged so that when the air filter is located in its operative position in association with co-operating parts of a motor vehicle, the inlet tube is caused to rotate so that the air intake orifice for the housing, effectively provided at its distal end, is directed towards a relatively warm region in the neighbourhood of the engine when the air temperature at the bimetallic element is relatively low, and vice versa. In the case of each embodiment coiled bimetallic elements are employed for the temperature sensing element; but it will be readily appreciated by those skilled in the art that alternative temperature sensing elements could be used. We have found that spirally coiled bimetallic elements are to be preferred as they are both efficient and reliable over a period of time and sufficiently cheap to be an economic proposition. The basic difference between the two embodiments specifically described is in the axis about which the relative rotation of the inlet extension tube member takes place. Depending upon the available space in the neighbourhood of the engine of the motor vehicle and the position in which it is desired that the air filter be located one or other of these embodiments may be preferred. It will also be appreciated by those skilled in the art that it may be desirable under certain circumstances for rotation to be avoided altogether and in such cases the inlet extension tube member may be bodily moved relatively to the casing of the air filter housing, for example guided in a pair of slots, in accordance with the temperature of inlet air entering the casing as sensed by a temperature responsive member.

Various arrangements for effecting this relative translation of the inlet extension tube member and the casing of the air filter housing will readily occur to those skilled in the art.

In all the preceding embodiments the outlet from the housing for the supply of filtered air to the carburettor is unillustrated, but in all cases it may consist simply of an outlet orifice member integral with the casing.

Figure 3:
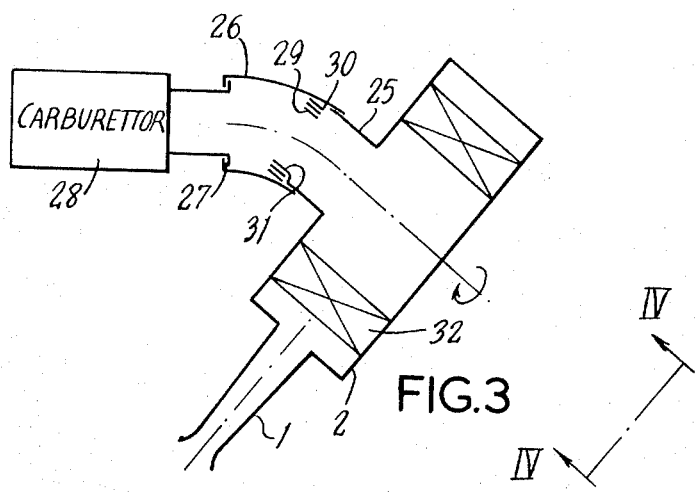
FIG. 3 shows an axial sectional view through a third embodiment of air filter housing constructed in accordance with the present invention.
Figure 4:
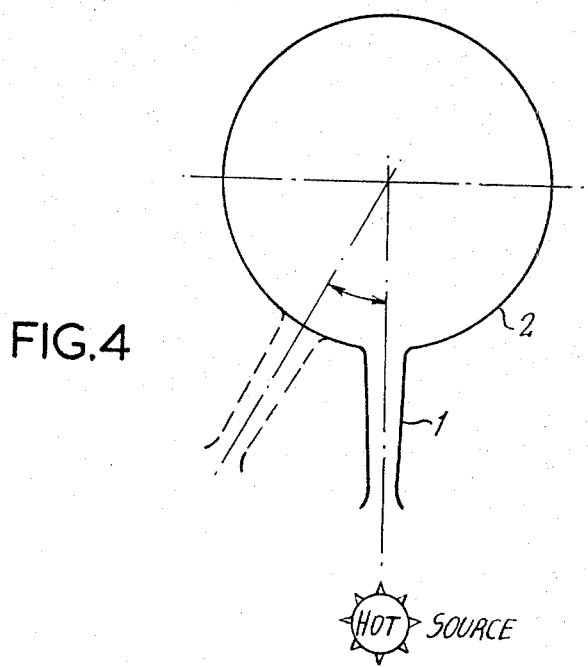
FIG. 4 shows an elevational view of the embodiment of FIG. 3 seen in the direction of the arrows IV — IV.

FIGS. 3 and 4 illustrate one example of an alternative arrangement in which the inlet extension tube member 1 is connected to th casing 2. The casing has an outlet boss 25 communicating with an outlet orifice member 26 connected at 27 for the supply of filtered air to an internal combustion engine carburettor indicated diagrammatically at 28. As will be seen from FIG. 3 the connection between the outlet orifice member 26 and the casing outlet boss 25 is by means of a spirally arranged bimetallic coil 29, the spirally outer end 30 of which is fixed to the outlet orifice member 26, and the spirally inner end 31 of which is fixed to the outlet boss 25. Within the casing 2, a generally annular filter element 32 is shown diagrammatically. Air flows from the air intake orifice at the distal extremity of the inlet extension tube 1, through the tube, inwardly through the filter element 32 and then axially of the casing 2 out through the outlet boss 25 and the outlet orifice member 26, passing over the bimetallic element 29. Changes in the temperature of the bimetallic element will result in relative coiling or uncoiling of its spiral turns, resulting in turn in relative rotation of the entire casing and inlet extension tube with respect to the outlet orifice member which does not move being connected to the carburettor intake.

FIG. 4 shows diagrammatically what happens. The position of the housing air intake orifice at the distal extremity of the inlet extension tube is varied between the extreme positions indicated. In practice the housing is made to rotate towards the dotted line position as the temperature of the bimetallic element increases and towards the solid line position as its temperature falls. In this way an automatic regulation of the temperature of air passing to the carburettor air intake is achieved.

In all the embodiments of air filter housing constructed in accordance with this invention some means of providing relative movement between the air intake orifice and the outlet orifice member is an essential feature. We have found that it is preferable for the air filter housing to be constructed from plastics materials. In addition to rendering such relative movement easier to achieve such materials are preferred for ease of manufacture and assembly and also because the tolerances on mating parts can be more closely controlled.

What is claimed is:

1. In a system for supplying air of controlled temperature to the carburetor for an internal combustion engine, comprising an air filter housing and conduit means together defining an air flow path from an inlet orifice through said housing to said carburetor, and a control responsive to the instantaneous temperature of air in the housing to vary accordingly the temperature of air passing through said flow path, that improvement comprising
    an adjustable joint in said conduit means providing for movement of said inlet orifice through a range of regions of varying air temperatures during operation of said carburetor,
    said control being operatively connected to said conduit means to adjust said joint and thereby move said orifice through said range.

2. The improvement of claim 1 wherein said joint is rotatable.

3. The improvement of claim 2 wherein said control comprises a coiled bimetallic element, said conduit means includes an inlet extension tube to provide said orifice, said joint is between said tube and said housing, and said bimetallic element has one end fixed to said tube and the other to said housing.

* * * * *